L. J. GORDON & W. J. TAIT.
Machine for Wrapping Tobacco, &c.
No. 224,332. Patented Feb. 10, 1880.
Fig. 1.
Fig. 5.
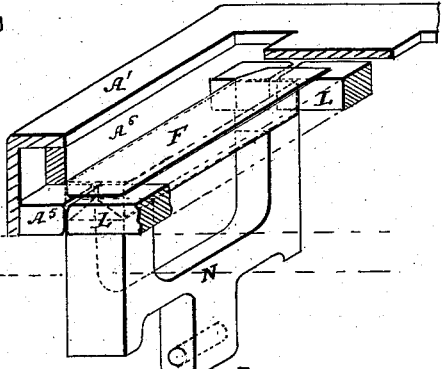
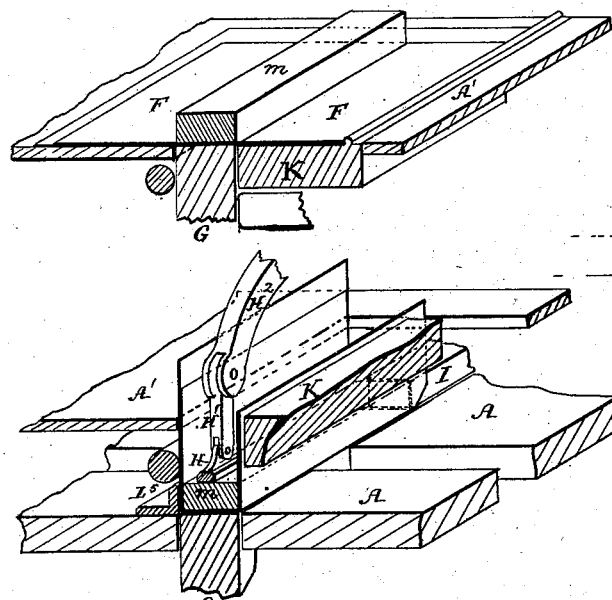
Fig. 6.
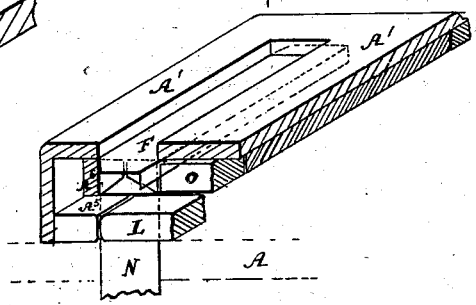
Fig. 2.
Fig. 3.
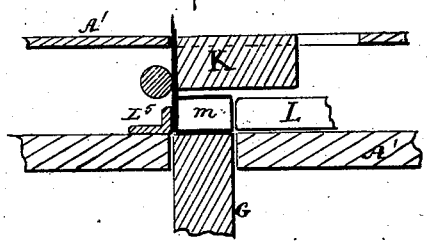
Fig. 7.
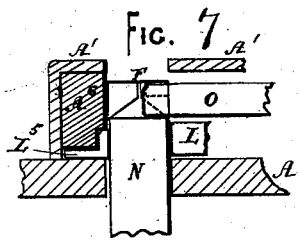
Fig. 4.
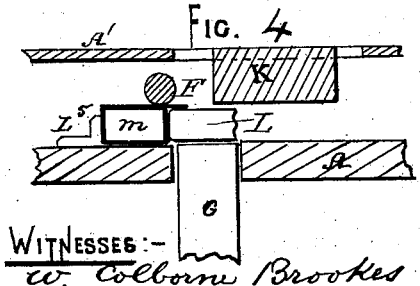
Fig. 8.
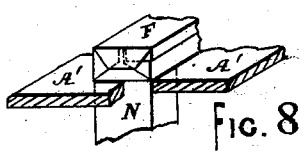
WITNESSES:—
W. Colborne Brookes
Charles C. Stetson
INVENTORS:—
L. J. Gordon and
W. J. Tait
by their attorneys

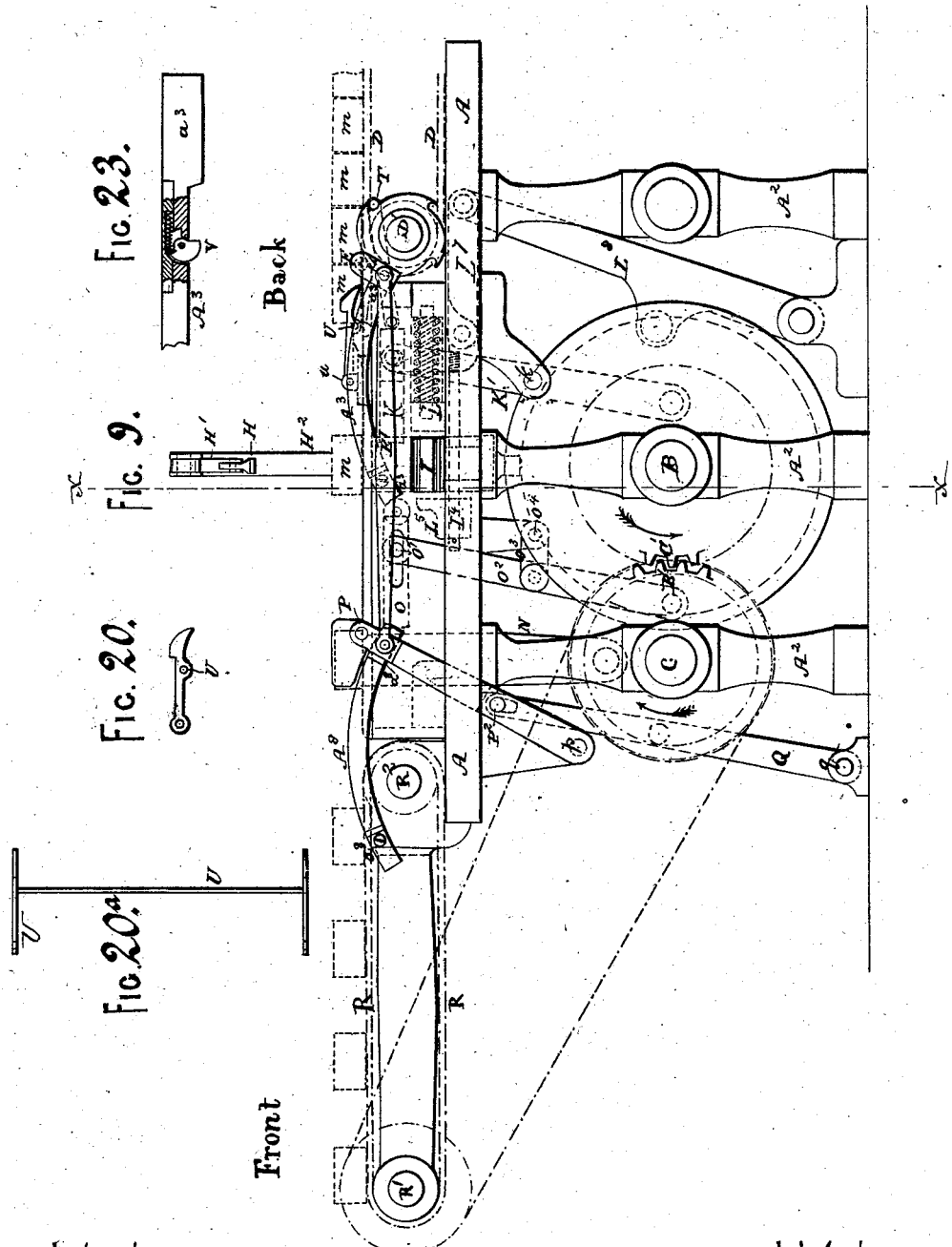

7 Sheets—Sheet 3.
L. J. GORDON & W. J. TAIT.
Machine for Wrapping Tobacco, &c.
No. 224,332. Patented Feb. 10, 1880.
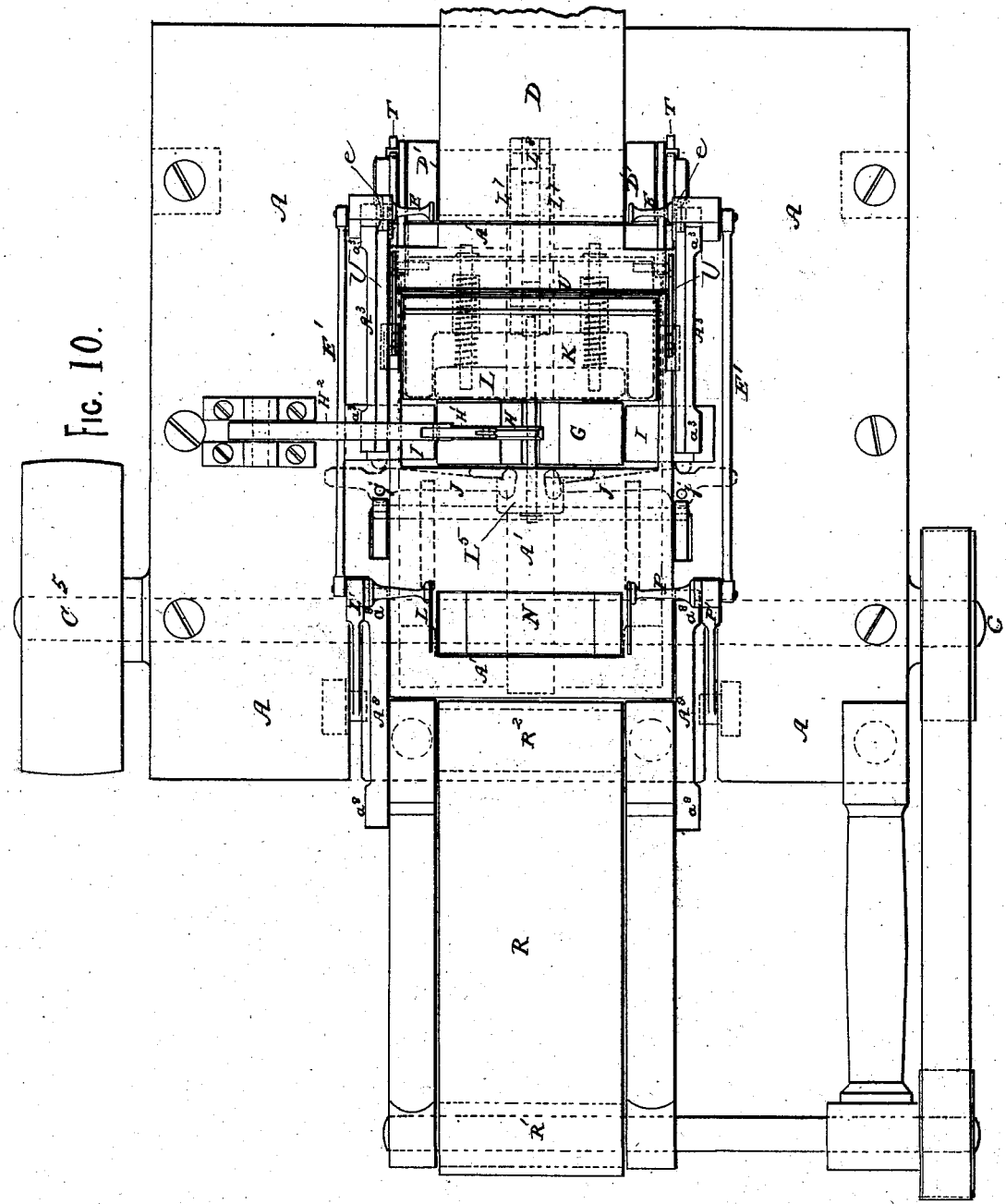

7 Sheets—Sheet 4.
L. J. GORDON & W. J. TAIT.
Machine for Wrapping Tobacco, &c.
No. 224,332. Patented Feb. 10, 1880.
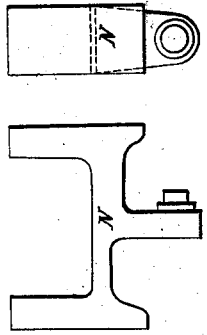
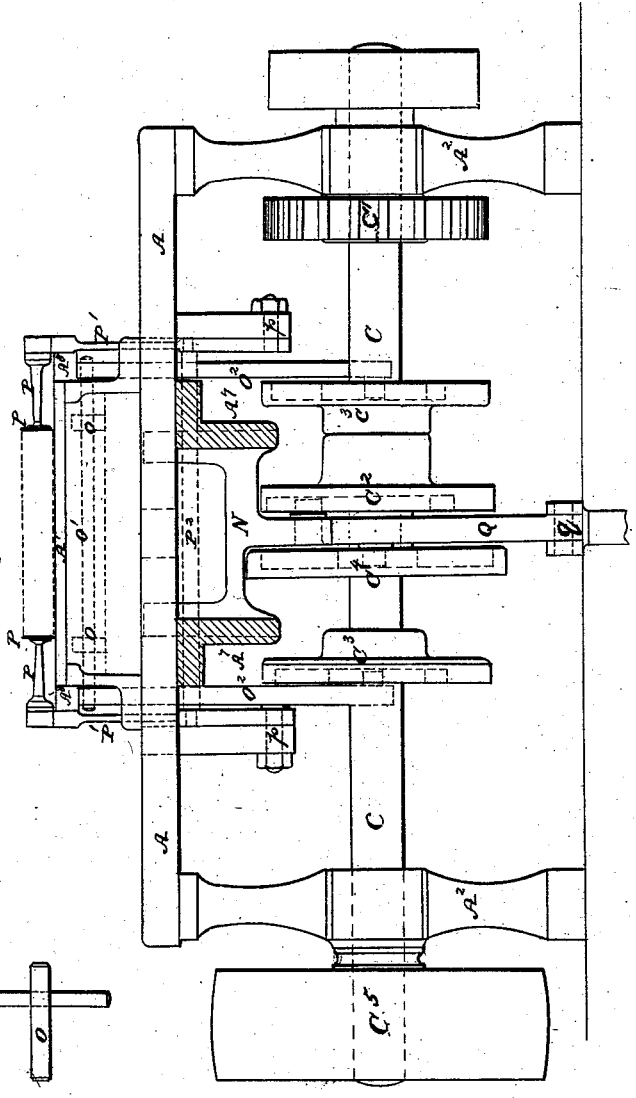
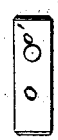
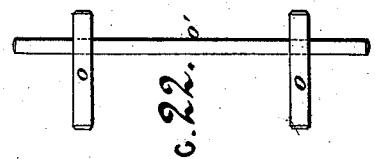
Witnesses:
W. Colborne Brookes
Charles C. Stetson
Inventors:
L. J. Gordon and
Wm. J. Tait
by their attorney C. C. Stetson 7 Sheets—Sheet 5.
L. J. GORDON & W. J. TAIT.
Machine for Wrapping Tobacco, &c.
No. 224,332. Patented Feb. 10, 1880.
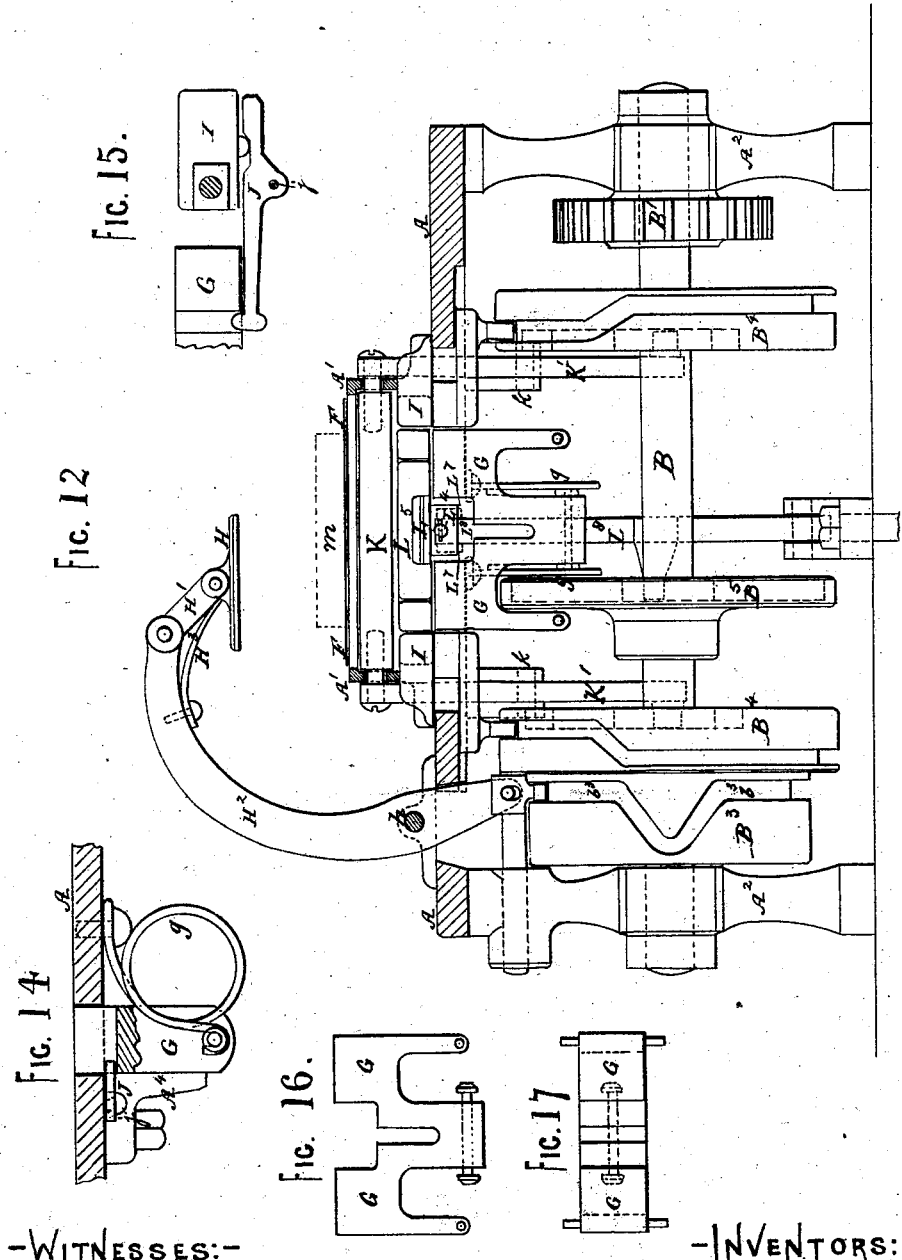
WITNESSES:—
W. Colborne Brookes
Charles C. Stetson
INVENTORS:—
L. J. Gordon and W. J. Tait
by their attorney
Thomas D. Stetson 7 Sheets—Sheet 6.

L. J. GORDON & W. J. TAIT.
Machine for Wrapping Tobacco, &c.

No. 224,332. Patented Feb. 10, 1880.

—Witnesses—
W. Colborn Brookes
Charles C. Stetson

—Inventors—
Leonard J. Gordon
William J. Tait
by their attorney C. D. Stetson

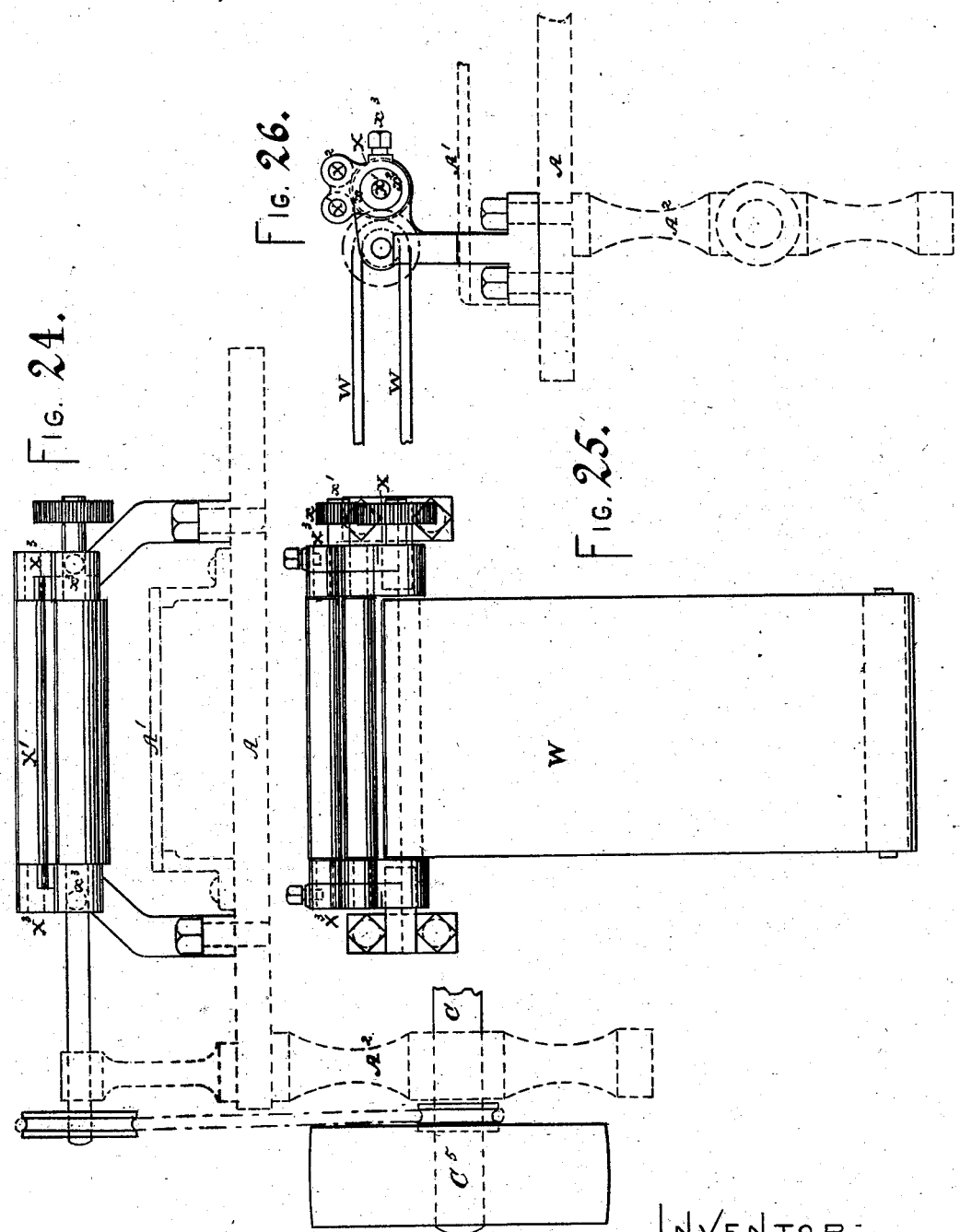

UNITED STATES PATENT OFFICE.

LEONARD J. GORDON AND WILLIAM J. TAIT, OF JERSEY CITY, N. J.

MACHINE FOR WRAPPING TOBACCO, &c.

SPECIFICATION forming part of Letters Patent No. 224,332, dated February 10, 1880.

Application filed April 3, 1879.

*To all whom it may concern:*

Be it known that we, LEONARD J. GORDON and WILLIAM J. TAIT, both of Jersey City, Hudson county, in the State of New Jersey, have invented certain new and useful Improvements relating to Machines for Wrapping Plug-Tobacco and analogous articles; and we do hereby declare that the following is a full and exact description thereof.

It is found desirable to prepare plug-tobacco in short lengths of an exactly rectangular section and with squared ends, and to cover the whole with an impervious envelope of tin-foil, or preferably with both tin-foil and a thin prepared paper, the paper being inside. Such are known in the trade as "nickel nuggets," and have come to be in great demand.

Our experiments have been made with a view more especially to applying the wrapping material in two thicknesses to these parallelopipedons of slightly-yielding tobacco with a sticky surface. We will describe the machine as being thus used, and may refer to the envelope by the single word "paper," although we wish it understood that the invention may be used to wrap other substances than tobacco, and to use other wrapping material than paper.

The plugs of tobacco are laid by hand or otherwise upon a continuously-moving belt or feeding-apron. As they arrive in succession at a certain point each is grasped endwise between two gripers, applied one at each end, with sufficient force to lift it, and is thereby lifted and transferred over in the arc of a circle, and when the gripers open is left lying in the proper position on a previously-laid double sheet of the required wrapping material. This wrapping material, assumed to be tin-foil below and thin paper made impervious by saturation with paraffine above, is supplied in the proper position by hand or by a suitable feeder between each operation. At the moment of receiving the tobacco thereon it lies in a plane condition on a flat table; but the rectangular surface immediately under where the plug is received is capable of sinking considerably below the plane of the adjacent parts. So soon as the gripers have deposited the plug in the right position, and have liberated it there and moved out of the way, a plunger of the proper size sinks upon the upper surface of the plug and presses downward thereon. At the same moment the supporting-surface immediately below is caused to sink, while the surface front and rear remains as before. The effect is to sink the tobacco through the table, and by the contact of the table-surface to cause the enveloping material to stand erect in front and rear. It also causes it to stand erect against each of the ends; but there is less material against each of the ends, and the fixed parts which effect the folding at those points are lower and cause the end parts to be folded later. These end parts are also movable, as will appear further on. The surfaces which effect the folding of the wrapping material upward on the front and rear sides of the plug may be stationary and form a portion of the immovable parts of the frame-work of the machine. The envelope is by this means reduced to the form of a trough having the tobacco in the bottom, a high flap of the envelope rising on each side and a narrow portion of the envelope of less height than the thickness of the tobacco folded up against the tobacco at each end. Having sunk the tobacco and its envelope by this means to the proper distance, the plunger rises again, leaving the tobacco there. Just before this retreat commences a slide approaches from the rear side, and, moving forward over the upper surface of the tobacco, folds down what we term the "rear flap" of the envelope thereon, and remains there. Next the movable end pieces or fingers, which were previously fixed and served to fold up the material at the ends, move away. Immediately after this a slide moves forward at the level of the tobacco and pushes it with its envelope bodily forward. This, by carrying it under a roller, folds down the remaining or front flap of enveloping material.

The surface which effects this latter folding may be fixed; but we prefer that it shall be a small roller turning in yielding bearings. This treats the folding material more delicately than a fixed surface could.

The envelope now lies in the form of a rectangular tube, the upper surface being of double thickness and the ends partly closed. It now remains to further fold the ends of the material. To effect this, the plug is forced against two pieces which are in position to fold the envelope at the ends from the front side, and at the same time two pieces, which are, in fact, parts of a single fork-shaped piece, move forward from the rear side and fold the end material from the rear. The front and back portions thus folded are sufficiently wide to nearly, but not quite, meet when thus applied flatly across the end. They lie over the previously-folded portion, which extends up from the bottom.

The next movement is a raising of the entire mass. A peculiarly-shaped piece, which we will for the present term a "plunger," but which does not fit over the whole bottom of the plug, rises from below and lifts bodily the entire mass. This movement is effected by two separate steps, between which provision is made for treating the package to give an intermediate partial fold; but the final effect of this movement is that the overhanging portions of the envelope at each end are folded downward by their contact with the fixed portions of the table A and complete the envelope.

For the full perfection of the envelope, we prefer that the front flap, so to speak, of the material, at an early stage of the process, shall be higher than the rear flap, this being effected by so laying the paper in the first instance that the plug shall not be placed on the center, but near the rear edge. This front flap, being considerably higher than the rear flap, extends more than quite across the top of the plug when it is folded down and overhangs at the rear. In the first installment of the rising motion of the plug this overhung portion along the sides is folded snugly down. This is done in the first part of the final lifting motion. Then the lifting is temporarily arrested, and slides come forward and fold against each end the narrow part just folded down.

The final installment of the lifting motion, effected by the further lifting of the same fork-shaped plunger beneath it, is sufficient to lift the completely-enveloped plug quite out and hold it entirely above the surface of the table. As it emerges it passes between two end clamps analogous to the end clamps which, at an earlier stage, delivered the naked plug upon the paper. These end clamps stand at a proper distance apart to receive the slightly-increased length of the plug between them. So soon as the plug is fully raised these end clamps are slightly contracted together, so as to press firmly against the several thicknesses of folded material on the ends. The next movement lifts these clamps, and with them the tobacco and its envelope pinched between them. It moves upward and forward in the arc of a circle from the receiving-point on the table to the delivering-point on a conveying apron or belt, which latter, receiving the wrapped plug by the opening of the clamps at the proper time, bears away the completely-wrapped plug, to be received by an attendant and packed in any suitable box.

We have succeeded in devising means by which all these motions are obtained through suitable cams and connections from a very simple train of mechanism.

The accompanying drawings form a part of this specification, and represent what we consider the best means of carrying out the invention.

Figures 1 to 8, inclusive, are diagrams representing the article to be wrapped, assumed to be a plug of tobacco, and the enveloping material and the immediately-adjacent parts of the machinery. There is no attempt in these preliminary diagrams to indicate the means by which the motions are attained, but only the effects of the motions on the plug and its envelope.

Fig. 1 is a section, with a partial isometrical view, showing the plug lying on the plane enveloping material.

Fig. 2 is a section and also a partial isometrical view, showing the plug fully depressed by the action of the plunger. In this figure the enveloping material extends perpendicularly upward on the front and rear side of the plug, the front flap being the highest. There are two fingers, one at each end of the plug, which, standing at a lower level than the upper surface of the table, act later to fold up the ends. One of these fingers is partly indicated at the farther end of the plug by the letter I.

Fig. 3 is a section showing the same after the slide has moved over it and folded down the rear flap upon the top of the plug.

Fig. 4 is a section showing the same after a lower slide has acted and has commenced to move the plug bodily forward. In this movement the material passes under a roller, which folds the front flap snugly down upon the top of the previously-folded rear flap.

Fig. 5 is an isometrical view. In this the plug with its envelope is partly concealed. It is in the condition which ensues after it has been moved to or immediately under the position where the finishing operations are to be performed. The fingers which fold horizontally inward the material over the ends have just acted, and are standing in that position. The enveloping material is now folded into a complete rectangular tube, with the last edge overhanging and requiring to be folded down by a subsequent operation. The ends of this tube have been only partly closed by the folding upward from the bottom induced by the fingers I.

Fig. 6 is an isometrical view, showing the plug and its envelope after it has been partially raised. Here the long remaining edge of the envelope is folded down. The only further treatment required is at the ends.

Fig. 7 is a section representing the action of one of the last fingers. A finger of a little less height than the plug has moved from the rear partly across the end of the plug. It has folded inward the material, and there now remains only an overhanging tapering portion at the top, which, on being folded down by any suitable means, will complete the wrapping. The means employed is the lifting of the plug past a fixed portion of the table, which rubs against the overhanging material and folds it smoothly downward.

Fig. 8 represents a portion of the finished plug in isometrical perspective. It has just been ejected from the interior of the machine by being forced upward through the upper surface of the table.

Figs. 9 to 12, inclusive, represent the main body of the machine.

Fig. 9 is a side elevation.

Fig. 10 is a plan view.

Fig. 11 is a front view, with the delivering-belt and other parts removed.

Fig. 12 is a section on the line $x\ x$ in Fig. 9, viewed from the front.

The remaining figures show details detached.

Figure 13:
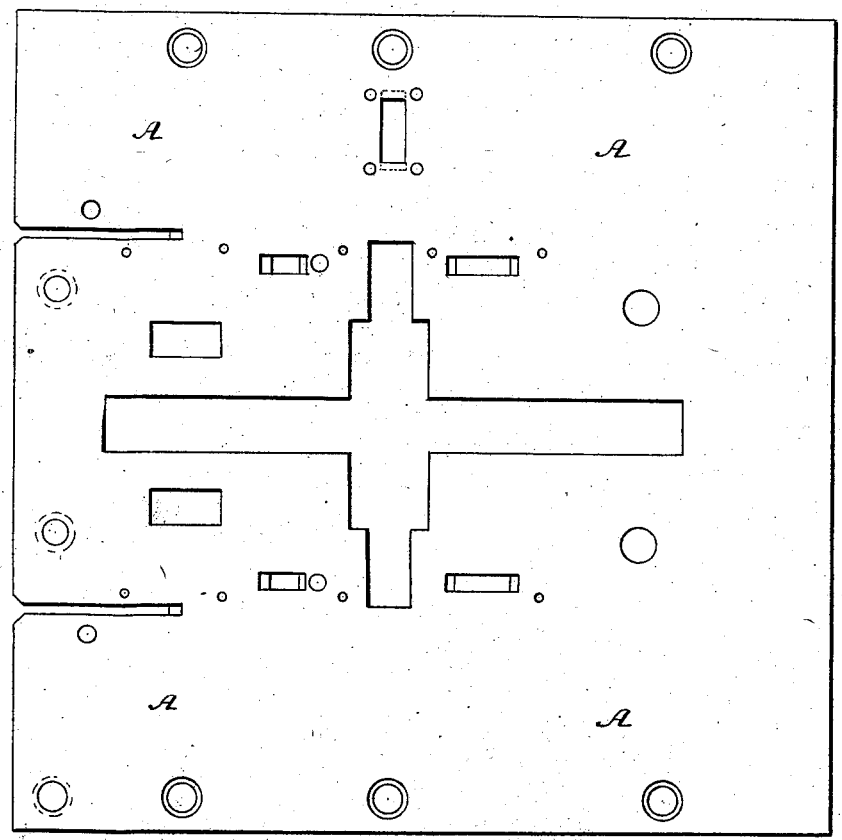

Fig. 13 is a plan view of what we term the "bed-plate"—an extended casting peculiarly perforated. It forms the foundation upon and above which the several operations on the tobacco-plug are effected. It is supported on legs, as indicated in the other figures. The cams and connecting mechanisms which impart the motions are mainly below this bed-plate.

Figs. 14 to 17, inclusive, represent the provisions for lowering the plug on its first reception.

Fig. 14 is a side elevation, partly in section, showing the plunger and its supporting-spring and guiding means. This figure also shows an important provision for locking it against a too early return.

Fig. 15 is a plan view of the same. This shows also at one side a provision for operating the locking-pieces or latches by the motion of the fingers.

Fig. 16 is a rear view of the plunger detached from all surroundings.

Fig. 17 is a top view of the same.

Figure 19:
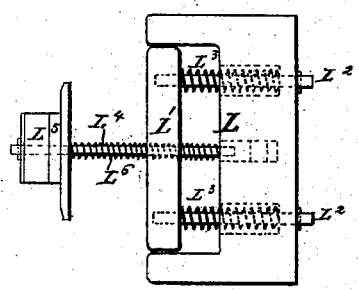
Figure 18:
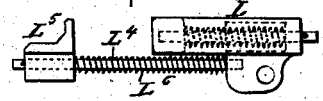

Figs. 18 and 19 represent the slide and its attachments, which move the plug and its envelope toward the front of the machine after it has been fully depressed.

Fig. 18 is a side view, and Fig. 19 is a plan, of the same.

Figs. 20 and 20ª represent the stop which acts to arrest the plugs as they are fed in by the belt or apron.

Fig. 20 is a side view, and Fig. 20ª a top view, of the same.

Figs. 21 and 21ª show the lifter, which performs important functions in the completion of the folding operation and the delivery of the completely-enveloped plug.

Fig. 21 is a front view, and Fig. 21ª an edge view, of the same.

Figs. 22 and 22ª show certain fingers with their connecting-arms, which effect the folding of a small portion of the envelope near the close of the operation.

Fig. 22 is a plan view, and Fig. 22ª is a side view, of the same.

Fig. 23 shows our provision for opening the feed-clamps on their forward movement and allowing them to close in their backward movement. It is a plan view on a larger scale than any of the other figures.

Figs. 24, 25, and 26 represent the mechanism for supplying the wrapping material to the machine.

Fig. 24 is a front view, Fig. 25 a plan, and Fig. 26 a partial side view, of the same.

In Figs. 24 and 26 parts of the main machine are represented in dotted lines.

Similar letters of reference indicate like parts in all the figures.

The rigid frame-work of this machine performs two functions. It supports the working parts, and thus performs the ordinary functions of a frame-work. It also, by itself, acts passively against the enveloping material, which is, at several stages, thrust against it or moved past it to effect the folding.

The bed-plate or main portion is marked A, and is an extended piece of stout material peculiarly perforated, as indicated. A table, A', is rigidly supported at a little distance above the bed-plate, and forms the top surface, on which the envelope and tobacco are applied at an early stage, and above which the completely enveloped tobacco is finally protruded at or near the completion of the operation. Stout posts $A^2$ extend downward from the bed.

B and C are uniformly-revolving shafts geared together by the equal spur-gear wheels B' C', and receiving motion through the pulley $C^5$ by a belt from a steam-engine or other suitable power. (Not represented.)

D is an endless belt. It is stretched over two pulleys, one of which, D', alone is shown. The naked rectangular pieces of tobacco, marked $m$, are placed, by hand or otherwise, on this belt. The belt receives an intermittent feeding motion, which feeds the plugs forward, as required.

E E are feeding clamps or jaws traversing on fixed curved ways $A^3$, formed with cam-like swells on their exterior faces at each end, as indicated by $a^3$. The clamps E are equipped with springs $e$, partly shown in dotted lines, which urge them gently inward and cause them to bear against the outer face of the guide. The clamps are worked at such a distance apart corresponding to the length of the plugs $m$ that when they are strained apart by the swells or cams $a^3$ they receive or deliver the plug; but when allowed to come nearer together in the main portion of their traverse by the gentle force of their contained springs $e$ they seize and hold the plug. Each time the clamps E are moved backward they open by the means described farther on and remain open a little time. During this interval the belt D moves a plug of tobacco forward and places it in position. On the forward motion of the clamps they close together on leaving the swells $a^3$ and seize and lift the plug. The clamps E carry the plugs over in their curved motion until they are again separated by the swells $a^3$ at the front end of their motion. That releases the plug.

The enveloping material is preferably of two thicknesses, as heretofore explained, but both are worked collectively as one, and will be indicated by the single letter F. We will describe them in the singular as "paper" or "envelope." It may be two or more than two thicknesses, but worked as a single thickness. This envelope F, having been previously laid in a plane condition, rests on the table A' and on a sinking support, G, and slide K. The width of the yielding support G is equal to the width of the plug $m$. It is held up by springs $g$ $g$, Figs. 12 and 14, and is supported by a fixed guide on the front face, as indicated by $A^4$.

The depositing of the plug in the proper position on the envelope and its firm retention there directly over the sinking support are aided by a depressor, H, Figs. 2, 9, 10, and 12. This is hung, by a link, H', to a lever, $H^2$, turning on a fixed center, $h$, and operated by a cam-groove, $b^3$, in a cam-wheel, $B^3$, fixed on the shaft B. The motion of this cam is transmitted to the lever through a roller mounted on a slide, as shown in Fig. 12. A spring, $H^3$, modifies the mobility of the link H' and allows it to yield just sufficiently for the purpose. There is a pin-stop (not shown) on the depressor, which prevents the link from yielding except in one direction.

Plug-tobacco has an adhesive nature, which renders it difficult to slide anything upon its surface. The link and spring allow the depressor to remain in contact in the same position in which it first touches the tobacco, while the link and spring accommodate the curved motion of the lever $H^2$. The depressor sinks at the proper moment upon the upper face of the plug $m$ just as the feeding-clamps E are liberating it. It first presses it squarely down upon the plane envelope F. It next, continuing its depressing motion, sinks the tobacco through the table, this motion being allowed by the sinking of the support G by the yielding of its spring $g$. The sinking motion folds up the envelope F into the form of a trough, the rear wall being the lowest.

After the depressor has urged the plug downward a little by the yielding of the spring $g$ and the envelope F has been folded upward properly at the front and rear and caused to stand in a trough form, the further sinking of the plug by the continued sinking of the depressor brings the ends of this trough into contact with what we term the "first-end-folding fingers." These are marked I, Figs. 2, 9, 10, 12, and 15. These fingers I are stationary at this period. They are a little narrower than the plug, and fold the bottom of the trough smoothly upward against the ends of the plug, leaving the side material projecting nearly the same as before.

The plug $m$ and its yielding support having been now depressed to the fullest extent required, two locking-latches, J, turning on fixed centers $j$, are thrust backward and engage with the yielding support. (See Fig. 15.) The locking-latches are moved by the folding-fingers 1, which latter, in moving toward each other to attain the position for folding the envelope, disengage the latches, and in moving outward or apart from each other away from the tobacco throw the latches into engagement with the sinking support G. Simultaneously with this latter movement the first folding-slide, K, moves from the rear forward, and commences to fold the rear flap of the envelope F downward upon the tobacco. The depressor H, being narrower than the plug, allows this motion to be commenced before the depressor retreats. Next the depressor retreats, and the first folding-slide, K, completes its motion. The rear flap is now held smoothly folded down upon the upper surface of the tobacco. This motion of the folding-slide K is received through two levers, K'. These turn on fixed centers $k$, and are actuated by grooves on the inner faces of two cam-wheels, $B^4$, fixed on the shaft B. Before the plug is moved bodily to fold down the front flap the end-folding fingers I must be withdrawn. They are each moved directly away from the tobacco and from each other, being guided by the form of the slot in the bed A, in which they are mounted, and actuated by cam-grooves in the peripheries of the cam-wheels $B^4$, to which they are suitably connected.

In the movement of the tobacco and its envelope bodily forward which next ensues the tobacco is held and controlled by a peculiarly-constructed slide and clamp, which has been engaged at an earlier period, and which must now receive attention. This slide reciprocates horizontally, and has a relatively long traverse. During the early stages of the treatment of a plug its main body L lies immediately under the first folding-slide, K. It has considerable length, extending crosswise of the machine, and has a deep recess in its working-edge of a length only a little greater than the tobacco, which recess is partly filled by a yielding piece, L', Fig. 19, guided by bolts or arms $L^2$, and subject to the action of springs $L^3$, which, under ordinary conditions, hold the movable piece L' in line with the adjacent edge and make it serve as a continuous edge.

$L^4$ is an arm, which may be of only moderate thickness, extending rigidly backward under the tobacco, and carrying a clamp, $L^5$, which is held outward by the gentle pressure of a spring, $L^6$. The space between the jaw $L^5$ and the main body L, with its spring-piece L', is just equal to or a little less than the width of the tobacco with its envelope. When the tobacco is forced down by the depressor it enters between the slightly-beveled edges of these parts and forces the piece L' slightly inward against the tension of the springs L³. These parts, therefore, hold the tobacco as a gentle clamp.

The slide L and its attachments as thus organized are by means of links L⁷ and a lever, L⁸, controlled by a face cam-groove on the wheel B⁵, fixed on the shaft B. (See Fig. 9.) At the proper moment, so soon as all the preceding operations have been completed, the slide L and its attachments are moved forward in the machine, carrying the tobacco with its body wrapped around the middle, except the folding down of the final edge, and with its ends commenced to be folded, as before explained. The tobacco is carried in this manner, clamped between the pieces L' and L⁵, until it has nearly reached the point over the shaft C where the succeeding operations are to be performed. As it reaches the termination of this horizontal movement, the first experience in its new home is that the projecting ends of its wrapper strike against and are folded by fixed stops A⁵, Fig. 5. These stops fold the ends of the envelope inward over the back half of each end. Now the main front surface of the plug bears fairly against a fixed wall of metal, A⁶, which is only recessed sufficiently to allow the clamp L⁵ to enter, which it completely fills, so that the clamp L⁵ forms a part of a plain wall thereby produced at the front of the plug. At this stage of the operation, the slide L being further pressed strongly forward, the yielding quality of its piece L' becomes available. The part L' stops and the main body of the slide L continues its forward march. Thus conditioned, the rigid front arms or forks of the slide L act to fold the ends of the envelope on the rear part of each end. This completes another stage of its progress.

The tobacco with its envelope has been transferred from its sinking place over the shaft B to its ultimate rising place over the shaft C, and has had the end projecting portions of its envelope F folded inward from both the front and rear side. The enveloping material should be of such dimensions that these flaps or folds will not quite meet when thus folded together from the front and rear. Next the main body of the slide L retreats or moves backward again, and the piece L', yielding to the tension of the springs L³, resumes its place in line with the front edge of L. Now the tobacco is only held with a gentle force between the yielding piece L' and the front piece or clamp, L⁵.

The clamp-piece is considerably narrower than the width of the tobacco.

We provide for lifting the tobacco by a forked piece, which, rising from below and formed with a sufficiently wide fork, allows the clamp L⁵ to move freely through it after it has risen. This piece we will call the "lifter." It is marked N, Figs. 5, 6, 7, 8, 9, 10, and 11. It is also shown detached in Figs. 21 and 21ª. It is guided in fixed ways A⁷ and actuated directly by a cam-groove in one face of a cam-wheel, C². The cam-groove is so formed as to effect the lifting of the plug at two motions. A considerable interval of rest occurs after it is lifted a little, to allow a folding operation to intervene.

The first installment of the lifting motion folds down the overhanging edge of the material F (shown in Fig. 4) along the whole length of the wrapper. This fully completes the wrapping of the main body; but the end material is left overhanging strongly, with its two thicknesses at the top, and with a little portion of the width of this last folded edge hanging down on the rear side. Now a slide, O, moves forward across each end of the plug and folds this last thin portion inward upon the previously-folded material there. These slides O are connected by a cross-bar, O', and guided in the fixed frame-work, so that they have only a simple reciprocating motion backward and forward. They are actuated through levers O², connected, by links O³, to fixed centers O⁴ by cam-grooves in the cam-wheels C³ fixed on the shaft C. This is the last folding which is effected by any moving part. Now the enwrapping is completed, except that a portion of the wrapping material F extends horizontally outward at each end in the plane of the top of the plug. Next the lifter completes its upward movement, and lifts the plug again bodily, brushing the overhanging ends of the material F as presented edgewise to the eye in Fig. 7 forcibly against fixed portions of the table A', which fold them smoothly down, as shown in perspective in Fig. 8. At the moment of its emergence through the table A' the delivering-clamps which are to grasp it by its ends and lift it are standing in position. These clamps are marked P, Figs. 9, 10, and 11. They are attached to or form an extension of arms P', which turn on fixed centers p. They are rigidly connected by a cross-bar, P². The center of this cross-bar is received in the center of the slot in a lever, Q, which turns on a fixed center, q, and is operated by a face-groove in a cam-wheel, C⁴. The motion thus imparted to the clamps P is controlled laterally by fixed curved guides A⁸, Figs. 9 and 10, which, like the guides A³, are formed with swells a⁸ on their outer faces at each end. As the clamps P approach the rear end of their traverse they are opened by the corresponding swells a⁸. They stand in that position awaiting the emergence of the completed package. So soon as the completely-wrapped tobacco has been fully protruded above the surface of the table the levers P', commencing to be moved forward, pass beyond the swells a⁸, and they press together by their elasticity, the levers P' being made elastic laterally for that purpose. They press together by their elastic force sufficient to seize the wrapped plug between them, and, maintaining a gentle but reliable pressure against the recently-folded envelope F at the ends of the plug, transfer the plug bodily over, and, when the clamps P are opened by the passage of the arms P' upon the swells $a^3$ at the front end of the motion, they liberate the completely-wrapped plug.

The plug on being liberated may entirely drop away; but we prefer to treat it very gently for a time. It is received on a continuously-traversing belt, R, which runs on pulleys R' R². The motion of this belt conveys away the package, so that before the clamps P can move backward away from the front swell, $a^3$, the package of tobacco has been conveyed beyond their influence.

The belt R may be of more or less length, and may carry the packages between closely-fitting sides, (not shown,) which shall hold the freshly-folded ends of the paper or other elastic enveloping material F constantly down. On their delivery from the belt they may be delivered on a fixed board or table, or may be received by the attendant directly from the belt and packed in suitable boxes.

Returning to the commencement of the operation, the backward and forward sweep of the feed-clamps E is received from the delivery-clamps P by means of links E'.

A proper intermittent motion of the feeding-belt D may be obtained by any suitable connection to a working part.

We have shown a ratchet-wheel on each end of the pulley D', with a pin on a link, T, engaging therein, and reciprocated by being attached to the first folding-slide, K. If this should not be found to give the motion at the best period, any other ordinary provisions for an intermittent motion may be employed.

We believe that a moderate continuous motion may be given to this belt D, and that the stop which we employ may be relied on to prevent its feeding forward too much or at a wrong period. We propose to employ the stop even with the best intermittent motion. It allows the employment of an excess of motion in the feeding-belt. What we esteem the simplest form of the stop is a straight wire, U, extending across the machine in the path of the entering series of plugs $m$, and standing ordinarily at a height sufficient to stop them. The wire is mounted on levers U', turning on fixed centers $u$. The rear ends of the levers U' are formed as shown, and the feed-clamps E, in commencing to move backward and take hold of the foremost plug, depress the inclined rear ends of the levers U and sink the stop temporarily down into a groove in the table. In this position the stop is of no effect, and the clamps having engaged with the foremost plug lift it and bear it away; but immediately that this operation is completed the stop rises by the force of a spring, $e$, (shown in dotted lines in Fig. 10,) and again stands in position to meet and arrest the next foremost plug when it arrives.

We believe that the machine may be worked as has been now described without our especial provision for opening the feed-clamps wide on their backward motion; but in such case the clamps would rub somewhat against the sticky tobacco in their reverse motion before taking hold for action. To avoid this we put a segment or a fraction of an anti-friction roller on a vertical pivot in the guide $A^3$, so that on the backward motion to take hold of a fresh plug the clamps E will strike the segment, and, by rolling it partially around, will be opened widely. After having thus passed the roller they will be held open by the swells $a^3$. On coming forward again they will commence to close on leaving the swells $a^3$, and now the segments will fail to hold them apart by reason of the clamps striking each segment upon its radius and turning it idly around.

V is the segment, Fig. 23. A spring of gentle force may be employed to incline the segment V to stand in the position shown, but ready to yield and allow it to turn in either direction.

Modifications may be made in many of the details. By making the envelope a little smaller, so as to avoid the necessity for the folding down of the final edge, and to avoid the folding inward of a portion thereof over each end, we can avoid the necessity for the step-by-step movement of the lifter, and can complete the lifting operation by a single continuous movement. We can also obviously in such case dispense with the fingers O and their operating means; but we prefer to retain all the features as here shown.

The machine of about the same size as here proposed may be used for wrapping various other articles than plug-tobacco. We propose, for example, to wrap sticks of chocolate, stove-polish, salve, and various other articles, and, by changing the proportions of the machine, to wrap cakes of plain or fancy soap, yeast, and various other articles. We propose to make the machine smaller and employ it for wrapping water-colors and other small articles. We may make it larger and employ it to wrap rectangular bottles of considerable size, cakes of starch, and other large packages.

Generally, we believe our machine is sufficiently gentle and effective to treat miscellaneous materials, even if they have but little capacity to maintain their shape. By giving a proper form, and perhaps facing some of the acting parts with felt or analogous yielding material, we can wrap, in substantially the same manner and with the same motions, parcels which are not rectangular but rounded in some or all of their dimensions. We believe packages may be greatly rounded, so as to be nearly or quite egg-shaped, and still be efficiently treated by our machine.

The foil, paper, or other wrapping material employed is, by preference, fed to the apparatus by an endless belt, W, upon which it is deposited in sheets of the desired size by hand or otherwise, and the said material is drawn away at the proper time by means of the rollers X X' X², the roller X being driven rapidly by means of a pulley, $x$, affixed on its axis $x'$, while the rollers X' X² simply revolve by frictional contact with the material as it is drawn forward by the roller X.

The speed of the roller X is so timed and regulated that it shall take hold of the wrapping material deposited thereon and impart sufficient impetus to the same to deposit it against a stop on the table A', ready for use.

The angle at which the paper is thrown from the rollers X X' X² is regulated by tilting the bearings X³, which are supported on the hubs $x^2$. The bearings X³, with the rollers X' X², are tilted to the desired angle, and there fixed by means of the set-screws $x^3$.

In other cases we may use a flat receiving-plate having an opening adapted to allow of the passage therethrough of the wrapping material when the material and its envelope are depressed into the machine, and allow of its ready removal after such depression without damaging the front and rear flaps of the wrapper which protrude above the table.

The feed-plate may be moved in and out of position by means of levers operated by cams affixed on the shaft B.

We claim as our invention—

1. In a machine for wrapping small articles, the positive stop U, arranged to stand in the path of the entering articles, and operating-lever U' and its actuating means to remove it out of the path at intervals and allow the foremost article to be seized and wrapped, as herein specified.

2. In a wrapping-machine, the segments V, in combination with the guides A³ and feed-clamps E, as herein specified.

3. In a wrapping-machine having a depressor, H, turning on a center at one side, as shown, the link H', lever H², and spring H³, adapted to serve as herein specified.

4. In a wrapping-machine, in combination with the depressor H, the yielding support G, fixed table A', and folding-slide K, adapted for folding upward the paper at the front and rear, and the end fingers, I, arranged at a lower level, adapted to fold the envelope upward at the ends after the sides have been folded upward, as herein specified.

5. In a wrapping-machine, the yielding clamp L', in combination with the clamp L⁵ and with the slide L, adapted to move the material and its partially-folded envelope bodily, and to effect a portion of the folding in so doing, as specified.

6. In a wrapping-machine, a train of mechanism, as described, adapted for receiving and sinking the tobacco below certain folding-surfaces, and thereby effecting a portion of the folding, in combination with a second train of mechanism, as described, adapted for transferring the article, with its partially-folded envelope, to another part of the machine, and effecting another portion of the folding by contact with certain folding-surfaces in transit, and with a third train of mechanism, as described, adapted for lifting and delivering the article and for effecting another portion of the folding by contact with folding-surfaces in this part of the operation, all substantially as herein set forth.

7. In a wrapping-machine, a fork-shaped lifter, N, adapted to raise the material and aid in the completion of the folding, in combination with transferring mechanism, operating between the parts of the fork, each without interfering with the other, as herein specified.

8. In a wrapping-machine, means, substantially as shown, for folding the sides of the envelope and for folding inward the end portions of the wrapper from the front and rear, in combination with means, substantially as described, for giving an intermittent lifting motion, and means, substantially as described, for folding down the upper edge of the envelope at each end, all arranged for joint operation relatively to each other and to means for folding a portion of the wrapper in any ordinary or suitable manner at an intermediate stage or stages, as herein specified.

9. In a wrapping-machine, the delivery-belt, in combination with mechanism for receiving, enveloping, and delivering the wrapped tobacco $m$, and with clamps P, for holding the freshly-folded ends until the package is delivered upon the belt, as specified.

In testimony whereof we have hereunto set our hands this 28th day of March, 1879, in the presence of two subscribing witnesses.

LEONARD J. GORDON.
WILLIAM J. TAIT.

Witnesses:
ELMONT W. SOMERS,
J. N. HOLTON.